Figure 1:
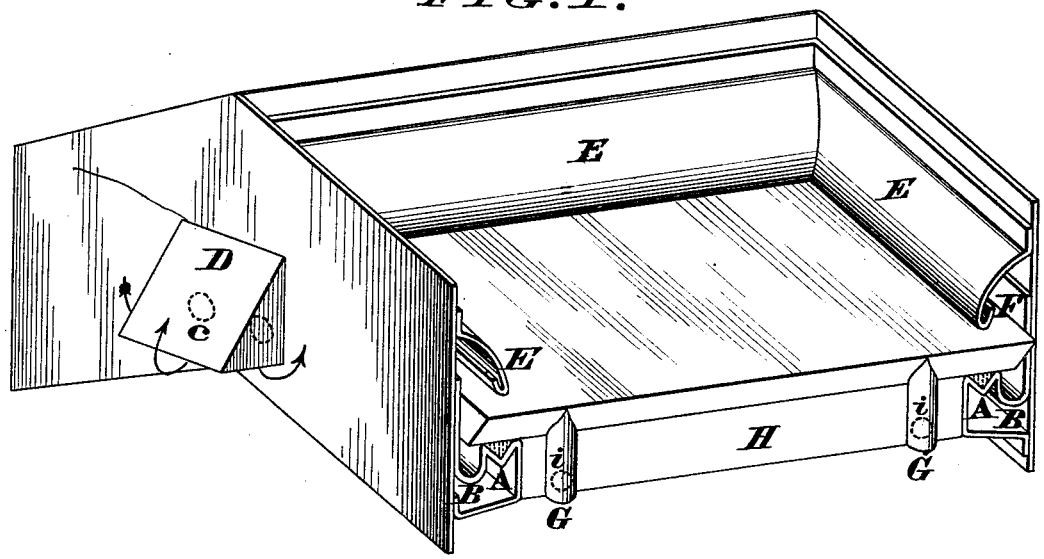

P. F. KIRK.
Self-Ventilating Sky-Light.

No. 198,462. Patented Dec. 25, 1877.

Inventor.
Patrick F. Kirk.
By Hatch & Parkinson
his Atty's

Attest.

UNITED STATES PATENT OFFICE.

PATRICK F. KIRK, OF CINCINNATI, OHIO.

IMPROVEMENT IN SELF-VENTILATING SKYLIGHTS.

Specification forming part of Letters Patent No. 198,462, dated December 25, 1877; application filed November 1, 1877.

*To all whom it may concern:*

Be it known that I, PATRICK F. KIRK, a resident of Cincinnati, county of Hamilton, and State of Ohio, have invented certain new and useful Improvements in Self-Ventilating Skylights; and do hereby declare the following to be a full, clear, and exact description thereof, reference being had to the accompanying drawing, and to the letters of reference marked thereon.

Prior to my invention skylights were ventilated by slatted openings under their gable-ends, through which impure air passed off.

My invention secures a more effectual and regular ventilation, as well as a more substantial and durable skylight.

My invention consists, first, in providing a galvanized-iron skylight with a double gutter—one for the putty by which the glass is sealed, the other to receive and conduct off the water or moisture that may drip into it; second, in providing for ventilation an air-duct under the gable of the skylight, into which air may enter through holes or openings, and be conducted out through openings at the ends of said air-duct, and similar ducts extending down the sides to the eaves of the skylight, by which all dust, soot, or rain are prevented from entering, and an outward draft is kept undisturbed; third, in providing a bead above the glass, against the sides, which presses and holds the glass in place, and furnishes at the same time an air-duct in which the air may circulate freely; fourth, some minor particulars of construction which add great strength and durability to my skylight.

To enable persons of competent skill to make and use my invention, I proceed to describe its entire construction.

Like letters refer to like parts in the drawing.

Figure 2:
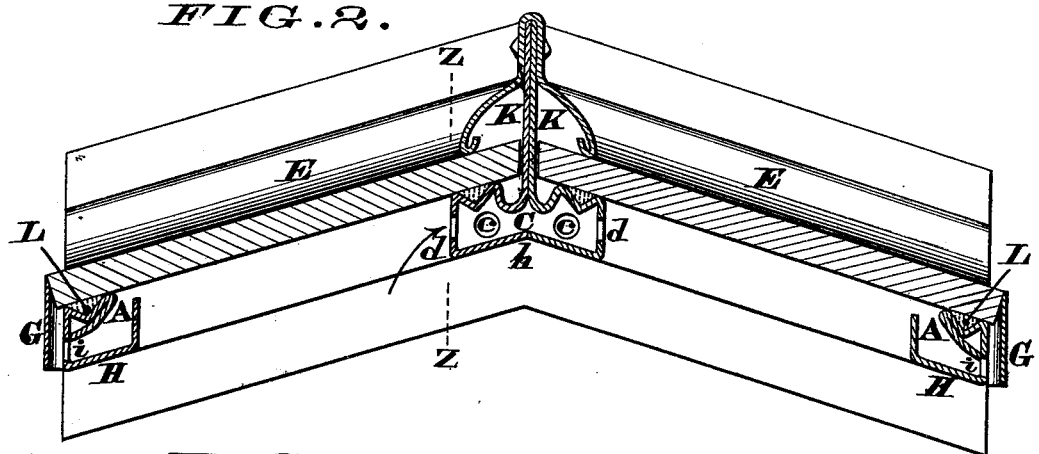
Figure 3:
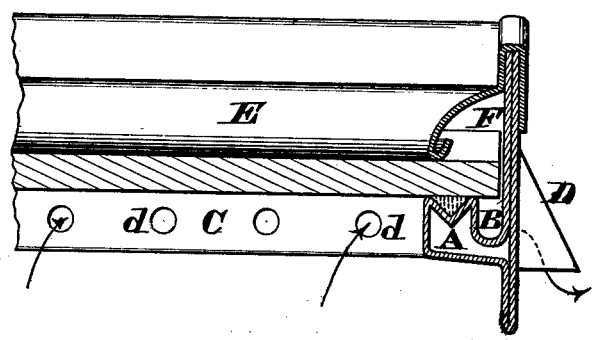

Figure 1 is a perspective view of the skylight. Fig. 2 is a transverse section of the same on an enlarged scale. Fig. 3 is a vertical section of a portion of the skylight, taken at the line Z Z.

A B represent the double gutter. A holds the putty by which the glass is sealed. B catches and carries off any water that may find its way under the bead E and drip over the edge of the glass. Both pass down the edge of the skylight, and under and parallel with the upper edge of the glass.

In all skylights more or less moisture or rain finds its way under the caps or beads to the edge of the glass, and in time gets into the cracks in the putty caused by the expansion and contraction of the metal bar, and injures and rots the putty. In my invention the drain-gutter B, being immediately under the edge of the glass, catches and conveys away all moisture that may enter under the bead E E, and does not allow it to come in contact with the putty.

Another advantage is gained by having these gutters side by side and close under the edge of the glass. The moisture dripping into B does not run down and streak the sides, and the whole is more compact and firm.

The passage under the gutters A B is connected by openings at the upper ends with the main duct C, thus permitting a complete circulation of air, while the boxing forming the passage and gutters serves to support other gutters.

In Figs. 2 and 3, C represents an air-duct extending under the glass the entire length of the skylight. $d\ d\ d\ d$ represent holes or openings through which air may enter the duct C, and pass through it and out at the openings $c\ c$ at the ends. D represents a cap or hood over the holes $c\ c$.

E E E represent the bead above the glass, against the sides, and holds the glass firmly down, and at the same time forms chambers through which the air circulates freely, by which means the crevices and edges beneath them are protected and kept dry.

The duct H serves to catch any water that may be formed or collected on the under side of the glass, and conducts it off through the holes $i\ i$. It also serves as an air-duct.

The caps G G hold the glass firmly in place, and prevent dust, soot, or rain from entering the holes $i\ i$.

I prefer to make duct C, the top of which also serves for the double gutter A B under the gables, of two pieces of metal, riveted together at K K, and at $h$ with the metal forming the beads. E E passes over the whole, as seen in Fig. 2, thus making it firmer and stronger.

I prefer to make, also, the putty-gutter L at the lower side of the glass, as seen at A, Fig. 2, of one piece of metal, bent round and back to the side, thus stiffening and strengthening the same. Of course the putty-gutter A may be made in any shape or size that will answer the same purpose.

Having fully described my invention, what I claim, and desire to secure by Letters Patent, is the following:

1. The double gutters A B, arranged side by side, the putty-gutter nearest the center of the glass, where no moisture can reach it, substantially as described.

2. The ventilating-duct C, connecting with the interior of the room by the openings $d\ d\ d\ d$, and so arranged that its upper wall forms the double gutters A B, and connecting with similar ducts extending round under the sides of the glass, substantially as and for the purposes described.

3. The caps G G, so arranged that they serve the double purpose of sustaining the glass and protecting the openings $i\ i$, substantially as described.

P. F. KIRK.

Witnesses:
ARTHUR STEIN,
JEREMIAH F. TWOHIG.